US012022597B2

(12) United States Patent
Hong et al.

(10) Patent No.: US 12,022,597 B2
(45) Date of Patent: Jun. 25, 2024

(54) SYSTEM AND METHOD FOR HEATING AN ITEM IN A MICROWAVE OVEN

(71) Applicant: Carnegie Mellon University, Pittsburgh, PA (US)

(72) Inventors: Jason I Hong, Pittsburgh, PA (US); Haojian Jin, Pittsburgh, PA (US); Swarun Kumar Suresh Kumar, Pittsburgh, PA (US); Jingxian Wang, Pittsburgh, PA (US)

(73) Assignee: Carnegie Mellon University, Pittsburgh, PA (US)

( * ) Notice: Subject to any disclaimer, the term of this patent is extended or adjusted under 35 U.S.C. 154(b) by 378 days.

(21) Appl. No.: 17/620,915

(22) PCT Filed: Jun. 22, 2020

(86) PCT No.: PCT/US2020/038891
§ 371 (c)(1),
(2) Date: Dec. 20, 2021

(87) PCT Pub. No.: WO2020/257751
PCT Pub. Date: Dec. 24, 2020

(65) Prior Publication Data

US 2022/0141928 A1 May 5, 2022

Related U.S. Application Data

(60) Provisional application No. 62/921,538, filed on Jun. 21, 2019.

(51) Int. Cl.
*H05B 6/64* (2006.01)
*H05B 6/68* (2006.01)
(Continued)

(52) U.S. Cl.
CPC ............ *H05B 6/6447* (2013.01); *H05B 6/68* (2013.01); *H05B 6/72* (2013.01); *H05B 6/76* (2013.01)

(58) Field of Classification Search
CPC .......... H05B 6/6447; H05B 6/68; H05B 6/70; H05B 6/72; H05B 6/76
(Continued)

(56) References Cited

U.S. PATENT DOCUMENTS 10,980,088 B2 * 4/2021 Leindecker ............ H05B 6/745
2001/0000403 A1 4/2001 Gaisford et al.
(Continued)

*Primary Examiner* — Quang T Van
(74) *Attorney, Agent, or Firm* — The Webb Law Firm

(57) ABSTRACT

Provided is a system and method for heating an item in a microwave oven. The method includes capturing, with at least one electromagnetic field sensor, at least one electromagnetic field measurement of a microwave chamber, each electromagnetic field measurement of the at least one electromagnetic field measurement corresponding to a region in the microwave chamber, generating an electromagnetic field map of the microwave chamber based on the at least one electromagnetic field measurement, capturing, with at least one sensor, a plurality of thermal measurements of the item being heated in the microwave chamber, each thermal measurement of the plurality of thermal measurements corresponding to a region on the item, and controlling at least one of a position of the item and the electromagnetic field while the item is being heated in the microwave chamber based on the electromagnetic field map and the plurality of thermal measurements.

23 Claims, 4 Drawing Sheets

(51) Int. Cl.
*H05B 6/72* (2006.01)
*H05B 6/76* (2006.01)

(58) Field of Classification Search
USPC ....... 219/702, 704, 709, 710, 712, 713, 714, 219/716, 725, 729, 730, 756, 759
See application file for complete search history.

(56) References Cited

U.S. PATENT DOCUMENTS

| | | | |
|---|---|---|---|
| 2010/0176123 | A1* | 7/2010 | Mihara .................. H05B 6/705 219/746 |
| 2012/0312810 | A1 | 12/2012 | Blankenbeckler et al. |
| 2013/0228567 | A1 | 9/2013 | Carlsson et al. |
| 2015/0289324 | A1 | 10/2015 | Rober et al. |
| 2016/0374158 | A1 | 12/2016 | Einziger et al. |
| 2017/0164429 | A1 | 6/2017 | Lerosey et al. |

* cited by examiner

SYSTEM AND METHOD FOR HEATING AN ITEM IN A MICROWAVE OVEN

CROSS-REFERENCE TO RELATED APPLICATIONS

This application is the United States phase of International Application No. PCT/US2020/038891 filed Jun. 22, 2020, and claims priority to U.S. Provisional Patent Application No. 62/921,538 filed Jun. 21, 2019, the disclosures of which are hereby incorporated by reference in their entirety.

BACKGROUND OF THE INVENTION

1. Field

This disclosure relates generally to heating an item with electromagnetic waves and, in non-limiting embodiments, to a system and method for heating an item in a microwave oven based on thermal and electromagnetic measurements.

2. Technical Considerations

Microwave ovens have been used for decades to heat food items using electromagnetic waves. Many microwave ovens utilize a turntable to rotate the food within the microwave oven during heating of the food in order to more evenly distribute the heating of the item. However, the use of a turntable still results in a blind heating of the food item. Such heating methods result in non-uniform heating of the item with unpredictable heating distributions. Food items can end up with undesired hot and/or cold spots after being heated in a microwave. Items that are composed of different materials may also require that the different materials are exposed to different electromagnetic fields in order to achieve the same temperature. Additionally, some food items may require that certain areas are heated to a different temperature than other areas of the item. For example, if both a steak and rice are put in the microwave at once, it would be desired to heat the steak to a different temperature than the rice. However, current microwave technologies do not efficiently or economically allow for a microwave oven to accomplish this. Therefore, there is a need for a microwave capable of evenly distributing heat using electromagnetic waves to efficiently heat an item while also allowing for the ability to heat certain portions of an item at different temperatures.

SUMMARY

According to non-limiting embodiments or aspects, provided is a method for heating an item in a microwave oven comprising: capturing, with at least one electromagnetic field sensor, at least one electromagnetic field measurement of a microwave chamber, each electromagnetic field measurement of the at least one electromagnetic field measurement corresponding to a region in the microwave chamber; generating an electromagnetic field map of the microwave chamber based on the at least one electromagnetic field measurement; capturing, with at least one sensor, a plurality of thermal measurements of the item being heated in the microwave chamber, each thermal measurement of the plurality of thermal measurements corresponding to a region on the item; and controlling at least one of a position of the item and the electromagnetic field while the item is being heated in the microwave chamber based on the electromagnetic field map and the plurality of thermal measurements.

In non-limiting embodiments or aspects, the method may further comprise arranging at least one microwave susceptor on the item. Controlling the electromagnetic field may comprise arranging at least one microwave shield in the microwave chamber.

In non-limiting embodiments or aspects, generating the electromagnetic field map may comprise applying an electromagnetic field to at least one neon light located within the microwave chamber; sensing, with at least one photo-sensor, alight emission by the at least one neon light; and estimating the electromagnetic field based on a location of the at least one neon light and at least one of a flashing frequency and a brightness of the at least one neon light.

In non-limiting embodiments or aspects, the at least one photo-sensor is located outside of the microwave chamber and the light emission by the at least one neon light is transferred outside of the microwave chamber through a fiber optic cable.

In non-limiting embodiments or aspects, controlling at least one of a position of the item and the electromagnetic field may comprise: comparing the plurality of thermal measurements to a desired heating pattern; determining a difference between the plurality of thermal measurements and the desired heating pattern; determining an estimated change in an electromagnetic field strength required to reduce the difference based on the electromagnetic field and a calculated future temperature; and adjusting the electromagnetic field based on the estimated change. The plurality of thermal measurements may be continuously compared to the desired heating pattern. The desired heating pattern may be a uniform temperature for each of the plurality of thermal measurements. The desired heating pattern may be predetermined based on a type of item placed within the microwave chamber.

In non-limiting embodiments or aspects, the item may be arranged on a turntable within the chamber, and controlling the position of the item may comprise altering at least one of the rate of rotation and the direction of rotation of the turntable.

According to non-limiting embodiments or aspects, provided is a system for heating an item in a microwave oven, the system comprising: at least one electromagnetic field sensor configured to capture at least one electromagnetic field measurement of a microwave chamber, each electromagnetic field measurement of the at least one electromagnetic field measurement corresponding to a region in the microwave chamber; generating, with at least one processor, an electromagnetic field map of the microwave chamber based on the at least one electromagnetic field measurement; at least one sensor, the sensor configured to capture a plurality of thermal measurements of the item being heated in the microwave chamber, each thermal measurement of the plurality of thermal measurements corresponding to a region on the item; and controlling, with at least one processor, at least one of a position of the item and the electromagnetic field while the item is being heated in the microwave chamber based on the electromagnetic field map and the plurality of thermal measurements.

In non-limiting embodiments or aspects, the system may comprise arranging at least one microwave susceptor on the item. Controlling the electromagnetic field may comprise arranging at least one microwave shield in the microwave chamber.

In non-limiting embodiments or aspects, generating the electromagnetic field map may comprise: applying an electromagnetic field to at least one neon light located within the microwave chamber; sensing, with at least one photo-sensor, alight emission by the at least one neon light; and estimating, with at least one processor, the electromagnetic field based on a location of the at least one neon light and at least one of a flashing frequency and a brightness of the at least one neon light.

In non-limiting embodiments or aspects, the at least one photo-sensor may be located outside of the microwave chamber and the light emission by the at least one neon light is transferred outside of the microwave chamber through a fiber optic cable.

In non-limiting embodiments or aspects, controlling at least one of a position of the item and the electromagnetic field may comprise: comparing, with at least one processor, the plurality of thermal measurements to a desired heating pattern; determining, with at least one processor, a difference between the plurality of thermal measurements and the desired heating pattern; determining, with at least one processor, an estimated change in an electromagnetic field strength required to reduce the difference based on the electromagnetic field and a calculated future temperature; and adjusting, with at least one processor, the electromagnetic field based on the estimated change.

In non-limiting embodiments or aspects, the plurality of thermal measurements may be continuously compared to the desired heating pattern. The desired heating pattern may be a uniform temperature for each of the plurality of thermal measurements. The desired heating pattern may be predetermined based on a type of item placed within the microwave chamber.

In non-limiting embodiments or aspects, the item may be arranged on a turntable within the chamber, wherein controlling the position of the item comprises altering at least one of the rate of rotation and the direction of rotation of the turntable.

Other non-limiting embodiments or aspects will be set forth in the following numbered clauses:

Clause 1. A method for heating an item in a microwave oven comprising: capturing, with at least one electromagnetic field sensor, at least one electromagnetic field measurement of a microwave chamber, each electromagnetic field measurement of the at least one electromagnetic field measurement corresponding to a region in the microwave chamber; generating an electromagnetic field map of the microwave chamber based on the at least one electromagnetic field measurement; capturing, with at least one sensor, a plurality of thermal measurements of the item being heated in the microwave chamber, each thermal measurement of the plurality of thermal measurements corresponding to a region on the item; and controlling at least one of a position of the item and the electromagnetic field while the item is being heated in the microwave chamber based on the electromagnetic field map and the plurality of thermal measurements.

Clause 2. The method of clause 1, further comprising arranging at least one microwave susceptor on the item.

Clause 3. The method of clause 1 or 2, wherein controlling the electromagnetic field comprises arranging at least one microwave shield in the microwave chamber.

Clause 4. The method of any of clauses 1-3, wherein generating the electromagnetic field map comprises: applying an electromagnetic field to at least one neon light located within the microwave chamber; sensing, with at least one photo-sensor, a light emission by the at least one neon light; and estimating the electromagnetic field based on a location of the at least one neon light and at least one of a flashing frequency and a brightness of the at least one neon light.

Clause 5. The method of any of clauses 1-4, wherein the at least one photo-sensor is located outside of the microwave chamber and the light emission by the at least one neon light is transferred outside of the microwave chamber through a fiber optic cable.

Clause 6. The method of any of clauses 1-5, wherein controlling at least one of a position of the item and the electromagnetic field further comprises: comparing the plurality of thermal measurements to a desired heating pattern; determining a difference between the plurality of thermal measurements and the desired heating pattern; determining an estimated change in an electromagnetic field strength required to reduce the difference based on the electromagnetic field and a calculated future temperature; and adjusting the electromagnetic field based on the estimated change.

Clause 7. The method of any of clauses 1-6, further comprising continuously comparing the plurality of thermal measurements to the desired heating pattern.

Clause 8. The method of any of clauses 1-7, wherein the desired heating pattern is a uniform temperature for each of the plurality of thermal measurements.

Clause 9. The method of any of clauses 1-8, wherein the desired heating pattern is predetermined based on a type of item placed within the microwave chamber.

Clause 10. The method of any of clauses 1-9, wherein the item is arranged on a turntable within the chamber, and wherein controlling the position of the item comprises altering at least one of the rate of rotation and the direction of rotation of the turntable.

Clause 11. A system for heating an item in a microwave oven, the system comprising: at least one electromagnetic field sensor configured to capture at least one electromagnetic field measurement of a microwave chamber, each electromagnetic field measurement of the at least one electromagnetic field measurement corresponding to a region in the microwave chamber; generating, with at least one processor, an electromagnetic field map of the microwave chamber based on the at least one electromagnetic field measurement; at least one sensor, the sensor configured to capture a plurality of thermal measurements of the item being heated in the microwave chamber, each thermal measurement of the plurality of thermal measurements corresponding to a region on the item; and controlling, with at least one processor, at least one of a position of the item and the electromagnetic field while the item is being heated in the microwave chamber based on the electromagnetic field map and the plurality of thermal measurements.

Clause 12. The system of clause 11, further comprising arranging at least one microwave susceptor on the item.

Clause 13. The system of clause 11 or 12, wherein controlling the electromagnetic field comprises arranging at least one microwave shield in the microwave chamber.

Clause 14. The system of any of clauses 11-13, wherein generating the electromagnetic field map comprises: applying an electromagnetic field to at least one neon light located within the microwave chamber; sensing, with at least one photo-sensor, a light emission by the at least one neon light; and estimating, with at least one processor, the electromagnetic field based on a location of the at least one neon light and at least one of a flashing frequency and a brightness of the at least one neon light.

Clause 15. The system of any of clauses 11-14, wherein the at least one photo-sensor is located outside of the microwave chamber and the light emission by the at least one neon light is transferred outside of the microwave chamber through a fiber optic cable.

Clause 16. The system of any of clauses 11-15, wherein controlling at least one of a position of the item and the electromagnetic field further comprises: comparing, with at least one processor, the plurality of thermal measurements to a desired heating pattern; determining, with at least one processor, a difference between the plurality of thermal measurements and the desired heating pattern; determining, with at least one processor, an estimated change in an electromagnetic field strength required to reduce the difference based on the electromagnetic field and a calculated future temperature; and adjusting, with at least one processor, the electromagnetic field based on the estimated change.

Clause 17. The system of any of clauses 11-16, further comprising continuously comparing the plurality of thermal measurements to the desired heating pattern.

Clause 18. The system of any of clauses 11-17, wherein the desired heating pattern is a uniform temperature for each of the plurality of thermal measurements.

Clause 19. The system of any of clauses 11-18, wherein the desired heating pattern is predetermined based on a type of item placed within the microwave chamber.

Clause 20. The system of any of clauses 11-19, wherein the item is arranged on a turntable within the chamber, and wherein controlling the position of the item comprises altering at least one of the rate of rotation and the direction of rotation of the turntable.

Clause 21. The system of any of clauses 11-20, wherein the desired heating pattern comprises a plurality of temperatures corresponding to a plurality of points on a surface of the item, wherein the plurality of temperatures comprises at least two different temperatures.

Clause 22. The system of any of clauses 11-21, wherein generating the electromagnetic field map comprises: applying an electromagnetic field to at least one dipole antenna located within the microwave chamber; converting, with at least one rectifier, an electric current emitted by the at least one dipole antenna to a direct current; and estimating the electromagnetic field based on a location of the at least one dipole antenna and the direct current of the at least one dipole antenna.

Clause 23. The system of any of clauses 11-22, wherein the item is arranged on a 6 DoF platform within the microwave chamber, and wherein controlling the position of the item comprises altering at least one of the following: a longitudinal location, a latitudinal location, an elevation, a pitch angle, a yaw angle, a roll angle, or any combination thereof.

BRIEF DESCRIPTION OF THE DRAWINGS

Additional advantages and details are explained in greater detail below with reference to the exemplary embodiments that are illustrated in the accompanying schematic figures, in which.

DESCRIPTION

Figure 1:
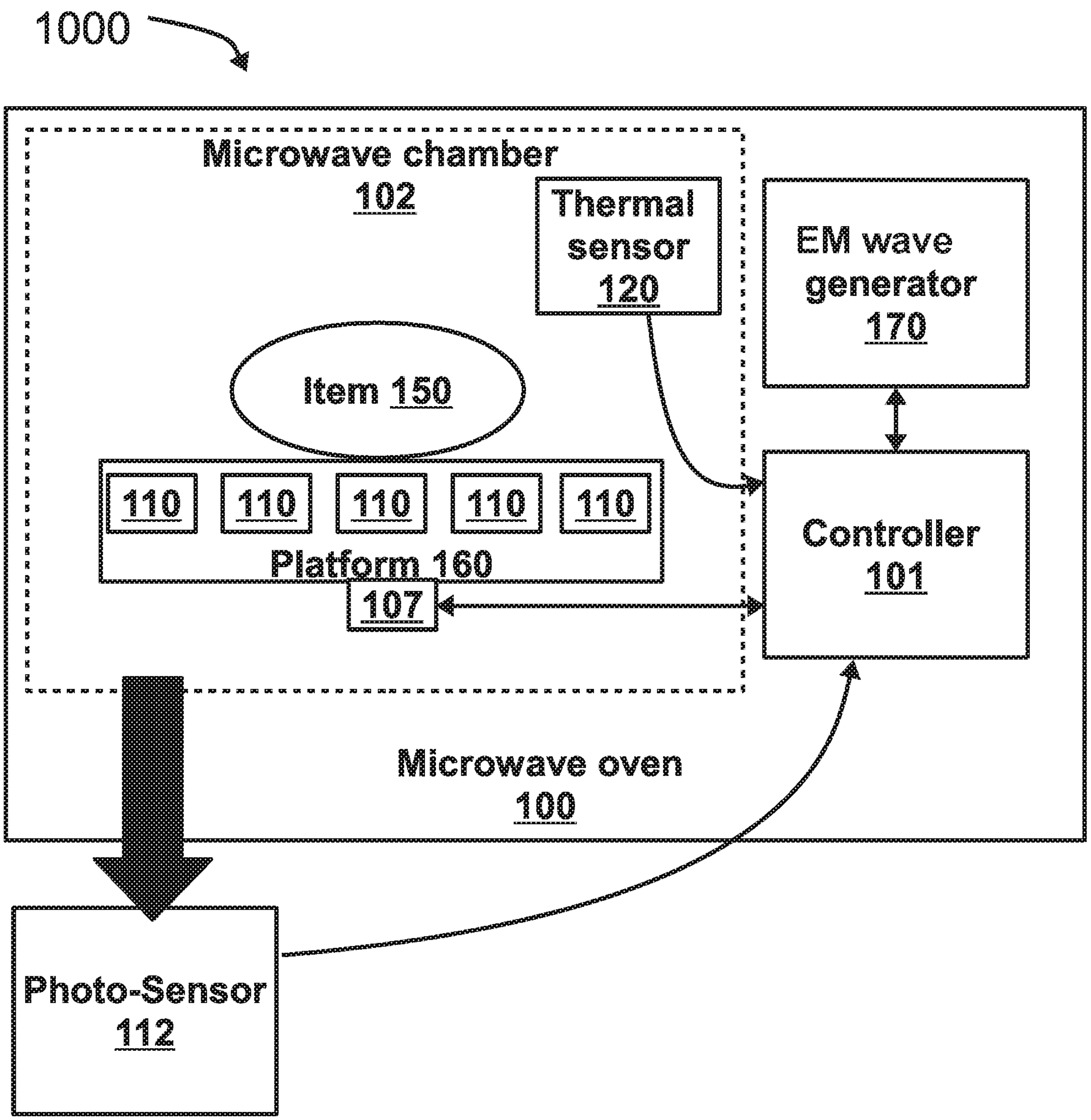
FIG. 1 is a block diagram of a system for heating an item in a microwave oven according to a non-limiting embodiment.

For purposes of the description hereinafter, the terms "end," "upper," "lower," "right," "left," "vertical," "horizontal," "top," "bottom," "lateral," "longitudinal," and derivatives thereof shall relate to the invention as it is oriented in the drawing figures. However, it is to be understood that the invention may assume various alternative variations and step sequences, except where expressly specified to the contrary. It is also to be understood that the specific devices and processes illustrated in the attached drawings, and described in the following specification, are simply exemplary embodiments or aspects of the invention. Hence, specific dimensions and other physical characteristics related to the embodiments or aspects disclosed herein are not to be considered as limiting.

No aspect, component, element, structure, act, step, function, instruction, and/or the like used herein should be construed as critical or essential unless explicitly described as such. Also, as used herein, the articles "a" and "an" are intended to include one or more items and may be used interchangeably with "one or more" and "at least one." Where only one item is intended, the term "one" or similar language is used. Also, as used herein, the terms "has," "have," "having," or the like are intended to be open-ended terms. Further, the phrase "based on" is intended to mean "based at least partially on" unless explicitly stated otherwise.

As used herein, the terms "communication" and "communicate" refer to the receipt or transfer of one or more signals, messages, commands, or other type of data. For one unit (e.g., any device, system, or component thereof) to be in communication with another unit means that the one unit is able to directly or indirectly receive data from and/or transmit data to the other unit. This may refer to a direct or indirect connection that is wired and/or wireless in nature. Additionally, two units may be in communication with each other even though the data transmitted may be modified, processed, relayed, and/or routed between the first and second unit. For example, a first unit may be in communication with a second unit even though the first unit passively receives data and does not actively transmit data to the second unit. As another example, a first unit may be in communication with a second unit if an intermediary unit processes data from one unit and transmits processed data to the second unit. It will be appreciated that numerous other arrangements are possible.

As used herein, the term "microwave susceptor" refers to a material that redirects electromagnetic materials toward itself. A microwave susceptor may be made of a silicon carbide material, as an example, although any material having such properties may be used. In some examples, a microwave susceptor may include a material that absorbs microwave energy (e.g., a microwave sponge). The material of a microwave susceptor may reach temperatures of 200+° C. within 1 minute of microwaving, as an example, although other variations and material properties are possible.

As used herein, the term "microwave shield" refers to a material that redirects electromagnetic materials away from a location within the microwave chamber. For example, a microwave shield may reflect microwave energy away from specific regions within the microwave chamber. Microwave shields may be metallic spheres, as an example, although other variations are possible. In some examples, the metallic spheres may be approximately 3.175 mm in diameter, although many other sizes are possible. Metallic spheres can be safely used in a microwave because they do not have any edges. As another example, microwave shields may include radio-reflective stirrer blades to deflect the electromagnetic waves.

As used herein, the term “waveguides” refers to a material and/or device used to redirect electromagnetic waves. For example, waveguides may include microwave shields and microwave susceptors.

FIG. 1 depicts a system 1000 for heating an item in a microwave oven 100 according to non-limiting embodiments. The system 1000 includes a microwave oven 100 having a chamber 102 to receive an item 150. The system 1000 also includes at least one electromagnetic field sensor 110, and at least one thermal sensor 120. The electromagnetic field sensor 110 may capture at least one measurement of the electromagnetic field corresponding to a region in the microwave oven 100 in which the electromagnetic field sensor 110 is located.

The system 1000 for heating an item in a microwave oven 100 may be retroactively installed in an existed microwave oven 100 or, in other examples, a microwave oven 100 may be manufactured with the system incorporated into the structure of the microwave oven 100.

The microwave oven 100 contains at least one electromagnetic (EM) wave generator 170 (e.g., a magnetron, a solid state transmitter, and/or the like), and a microwave chamber 102 that will be the target of the EM fields and receives the item 150. The microwave chamber 102 may be encased in a mesh to reduce leakage of EM fields to outside of the microwave chamber 102 (e.g., using a metallic Faraday cage). The mesh may include holes that are smaller than the wavelength of the microwave signal.

An item 150 or object may be arranged inside of the microwave chamber 102. The item 150 may be a consumable item, such as food or beverage, or the item 150 may be a non-consumable item. The item 150 may be arranged on top of a platform 160, such as a turntable. The item 150 may also be arranged in a vessel placed on the platform 160, such as a cup, bowl, plate, and/or the like. The platform 160 may be circular in shape, or may be rectangular, oval, triangular, and/or the like. The platform 160 may be movable, such as being configured to rotate in clockwise and/or counter-clockwise directions, to move in longitudinal and/or latitudinal directions, and/or to move up and/or down (e.g., changing elevation). In non-limiting embodiments, the platform may be suspended (e.g. supported by strings, poles, and/or the like) allowing movement of the item by manipulation of the supports of the platform. The platform may include a 6-degrees of freedom (6 DoF) platform to allow more degrees of freedom. The 6 DoF platform may allow movements in the longitudinal, latitudinal, and/or up and/or down directions (e.g., changing elevation) and may allow rotation about three perpendicular axes, including in the pitch, yaw, or roll directions. Additional degrees of freedom of movement will allow for finer actuation accuracy. In non-limiting embodiments, the platform may be able to tilt on an axis.

Figure 2:
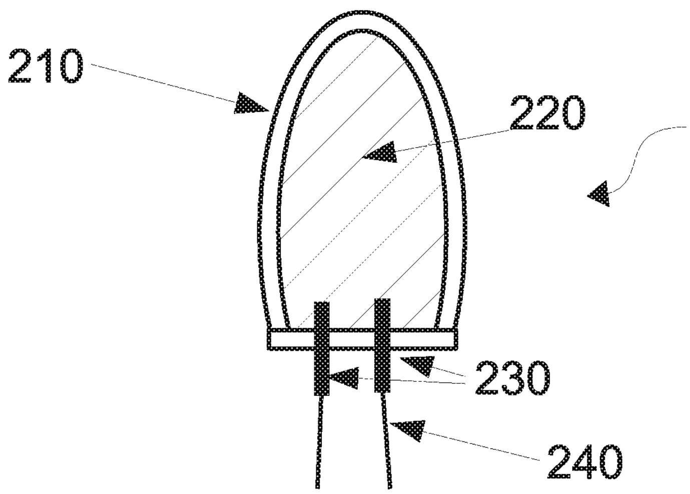
FIG. 2 is a neon light for measuring electromagnetic field strength according to a non-limiting embodiment.

In non-limiting embodiments, the electromagnetic field sensor 110 may include and/or utilize thermal pigments, thermal papers, radio receivers, and/or the like. Radio receivers may be used to measure the leakage out of the microwave chamber 102 and be arranged on the outside of the microwave chamber 102 to minimize the detrimental effects of the electromagnetic field on the radio receivers. In non-limiting embodiments, the electromagnetic field sensor 110 may include at least one dipole antenna. The dipole antenna may feed into at least one rectifier to measure the EM field strength based on the direct electrical measurements. In non-limiting embodiments, referring to FIG. 2, shown is an electromagnetic field sensor 110 in the form of a neon light 200. The neon light 200 may be Radio Frequency (RF)-powered.

Figure 3:
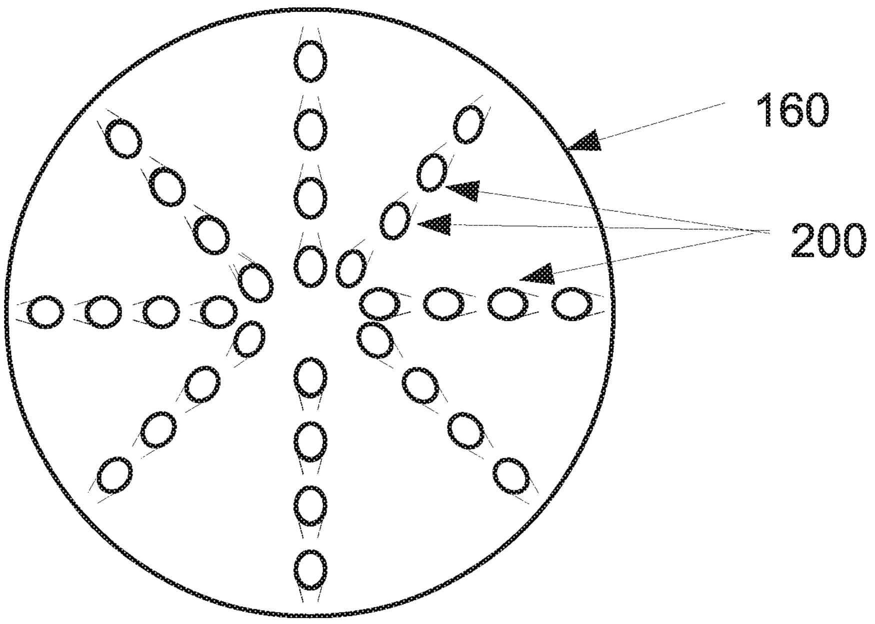
FIG. 3 is an array of neon lights attached to a turntable of a microwave oven according to a non-liming embodiment.

In non-limiting embodiments, the neon lights 200 may be located on the platform, sidewalls, door, floor, and/or ceiling of the microwave chamber. The neon lights 200 may also be located on any other surface in the microwave chamber 120, such as a container (e.g., vessel or the like) arranged on the platform 160. The container may be intended to be removed from the microwave chamber 120 after heating of the item 150 is completed. For example, the neon lights 200 may be arranged on, in, and/or under a platform 160 located in the chamber of the microwave 102. FIG. 3 shows a non-limiting embodiment in which the neon lights 200 are arranged with respect to the platform 160 in a pattern extending radially outward from a center of the platform 160. The platform 160 and/or a container arranged on the platform 160 may be made of a clear material, such as glass or plastic. The neon lights 200 may be arranged in an array in the microwave chamber. The neon lights 200 may be spaced such that the spacing between the neon lights 200 is less than the wavelength of the EM signal. In a non-limiting embodiment, the spacing may be 3 cm or less. In non-limiting embodiments, numerous neon lights 200 may be used on multiple surfaces. For example, in the non-limiting arrangement shown in FIG. 3, 32 neon lights 200 may be placed on the platform 160 and 32 neon lights 200 may be placed on a container arranged on the platform.

Referring to FIG. 2, a benefit of a neon light 200 is that it is microwave-safe and inexpensive, lacking sharp-edged metals that can cause sparks or fire and plastics that may release chemicals when heated, neither of which is desirable in proximity to food or electronic components. The neon light 200 may include a glass bulb 210 that contains neon gas 220 and, in some examples, a mixture of gases. The neon light 200 may include two electrodes 230, an anode and a cathode. The discharge of the electrodes 230 avoids energy accumulation in the neon light 200. The neon light 200 may consume a minimal amount of the microwave energy, e.g., about 19.5 mW versus 1100 W of the microwave oven. The bulbs 210 of the neon lights 200 may be about 5 mm in diameter and 13 mm in length, although various shapes and sizes may be used.

In non-limiting embodiments, and with continued reference to FIG. 2, the sensitivity of the neon lights 200 to changes in the EM field may be adjusted by changing the length of electrode wire extensions 240 of the neon lights 200. The sensitivity of the neon lights 200 is set such that the neon lights 200 are not too sensitive (e.g., sensitive past a threshold where the neon lights 200 could be caused to burn out when exposed to a strong EM field) and are not under sensitive (e.g., sensitive below a threshold such that the neon lights 200 would not light up when exposed to a low EM field). In order to provide a more fine-grained resolution of the EM field in the microwave chamber 102, the majority of the neon lights 200 may be configured to be constantly on or flashing at various frequencies when exposed to the EM field of the microwave. The wire extensions 240 may be between 0 mm and 15 mm or longer in length, as an example. In non-limiting embodiments, the wire extension 240 may be about 8 mm in length.

Still referring to FIG. 2, the neon lights 200 may glow in response to being exposed to an EM field. The EM field may create a potential difference between two electrodes 230 of the neon lights 200, causing electrons to accelerate away from the cathode and collide with the neon gas 220 atoms and/or molecules. The EM field may result in a potential difference ranging from, for example, 100 V to a several kV between the two electrodes. The collision will cause a light emission, thereby causing the neon light 200 to glow. The brightness of the light emission is proportional to the strength of the EM field. Below a threshold strength, the neon light 200 will remain dark and will not emit light. After the EM field reaches the threshold strength, while the EM field strength increases at a location corresponding to the neon light 200, the brightness of the light emission will increase. The threshold strength for a particular neon light 200 may depend on the minimum ionizing voltage required to keep the gas 220 in the neon light 200 ionized. The minimum ionizing voltage may depend on a number of factors, such as the type of electrodes 230, the type of coatings used for the electrodes, the composition of the gas 220, the gas pressure, and/or the like. The brightness of the emission of the neon light 200 may be measured to determine the EM field strength at a location corresponding to the neon light 200 (e.g., a location in the chamber that is co-located or adjacent the neon light 200).

The light emissions of the neon lights 200 may be detected by a photo-sensor 112, such as a visible light camera. Detection of the light emissions allow the phot-sensor to capture the real-time EM field strength. The photo-sensor 112 may be located outside of the microwave chamber 102. By placing the photo-sensor 112 outside the chamber 102, the photo-sensor 112 may be protected from the EM field. In non-limiting embodiments, the photo-sensor 112 may be located outside an opening of the microwave chamber 102 (e.g., a door or window of the microwave 100) such that the photo-sensor 112 is facing into the microwave chamber 102 through the opening of the microwave chamber 102. The opening may have a mesh to reduce leakage of electromagnetic waves through the opening and may be covered by a transparent or translucent material.

The light emissions of at least one neon light 200 may be obstructed from view of the photo-sensor 112 during operation of the microwave oven 100 due to an item or object being located between the neon light 200 and the photo-sensor 112. Therefore, in non-limiting embodiments, the light emissions may be redirected to place the light in view of the photo-sensor 112. For example, the light emission from the neon lights 200 may be redirected to be put in the view of the photo-sensor 112 by using optic fibers. In some non-limiting embodiments, the photo-sensor 112 may be located outside of the microwave chamber 102 but within the microwave 100. In other non-limiting embodiments, the photo-sensor 112 may be located outside of the microwave 100. One end of one or more optic fibers may be located at the neon light 200 while the second end of the optic fibers may be in the field of view of the photo-sensor 112. The end of the optic fibers in the view of the photo-sensor 112 may be static, such that if the neon light 200 moves location, the end of the optic fibers in view of the photo-sensor remains in place. The optic fibers may be 1 mm in diameter, for example, although other sizes may be used. The optic fibers may be made of a microwave-safe material, such as glass. The optic fibers may extend from the neon light 200 (e.g., one or more optic fiber for each neon light) and through the walls, door, floor, and/or ceiling of the microwave chamber 102. In some non-limiting embodiments, the optic fibers may be sized to fit through the mesh of the microwave 100. The optic fibers may also be routed through the vent of the microwave 100 in some non-limiting embodiments. The light emissions may also be redirected using other means, such as mirrors and/or other reflecting surfaces.

In non-limiting embodiments, more than one color may be used for the neon lights 200 arranged in the microwave chamber 102. For neon lights located on moving surfaces (e.g., a turntable or other platform), tracer neon lights may be used as reference points on the moving surface. For example, most of the neon lights on the moving surface may be orange and several (e.g., fewer than the number of orange lights) neon lights may be blue. The relative locations of the tracer neon lights are known (e.g., predefined). The locations of the tracer neon lights may be used to determine the location of the remaining neon lights 200 as the surface moves. The movable neon lights may be tracked using optical flow techniques.

In non-limiting embodiments, the photo-sensor 112 may be a visual camera. The visual camera may capture the brightness of the neon lights 200 in a real-time video stream. The optical fibers may be concentrated in a specific portion of the frame of the photo-sensor 112 (e.g., the top left corner of the frame of the visual camera). The frame of the visual camera may also view the microwave chamber 102 directly at the same time as viewing the optical fibers. The photo-sensor 112 may measure the brightness of the neon lights 200 continuously or continually. For example, the brightness may be measured every 0.1 second interval. It should be appreciated that other types of electromagnetic field sensors 110 may be used in a similar manner, either partially or fully, as described for the implementation of the neon lights 200.

In non-limiting embodiments, the measurements from the electromagnetic field sensor 110 may be used to generate an EM field intensity map of the microwave chamber 102. The EM field intensity map may be 3D or may be 2D. In embodiments in which neon lights 200 are used as the electromagnetic field sensor 110, an image may be captured of the neon lights 200 and/or the end of the optical fibers. The image may be converted to grayscale and a brightness score of the neon lights 200 and optical fibers may be calculated based on the sum of the pixel values around the neon light 200 or optic fiber end. The sum of the pixel values may be considered the brightness score of the electromagnetic field sensor. The brightness score is assigned to the known location of the respective neon light 200. The brightness score may also be calculated based on the measured flashing frequency of the neon light 200.

In non-limiting embodiments, the brightness score or flashing frequency may be used to estimate the EM field strength at the neon light 200. The EM field strength may be determined from empirical data of known EM field strengths from neon lamps at the same location from testing. The EM field strength at other locations within the microwave chamber 102 may be calculated based on a spatial interpolation of the EM field strengths of the neon light locations. For example, the spatial interpolation may be based on a cubic-spline interpolation. The EM field strength may be calculated at locations in the same geometric plane as the neon light locations or, in other examples, may be calculated in 3D space from the neon light locations. The measured and calculated EM field strengths may be mapped into a fine-grained spatial resolution 2D or 3D EM field intensity view of the inside of the microwave chamber 102.

In non-limiting embodiments, the thermal sensor 120 may measure the current temperature of the surface of the item 150 located within the microwave chamber 102. The thermal sensor 120 may be located on the roof, sidewall, door, or floor of the microwave chamber 102, as examples. In non-limiting embodiments, more than one thermal sensor may be arranged in different locations to measure different surfaces of the item 150. The thermal sensor may include a thermal camera in some examples. The thermal camera may have an accuracy of ±2.5° C. or better to achieve accurate results, although various thermal cameras may be used. The thermal sensor 120 may measure a plurality of thermal measurements, each thermal measurement corresponding to a region on the surface of the item 150. In some examples, the sensor output may be converted to a square array using interpolation calculations, such as a cubic-spline interpolation, of the thermal measurements.

In non-limiting embodiments, the EM field and the current temperature may be used to estimate the future temperature of the item. The thermal measurements alone allow for a current temperature of the item to be measured. Once the item is heated, the effect of the EM exposure cannot be undone and the heating process from that exposure may continue after the instantaneous temperature measurement. Therefore, in order to provide better control of the heating of the item, it is beneficial to predict what the future temperature of the item 150 will be and make adjustments to the EM field strength before the item 150 reaches that future temperature. This may not be calculable with the EM field strength measurements alone because the same EM field strength may have different effects on different items 150 due to differences in the material compositions of the item 150. Additionally, integrating EM field intensities over time may result in a progressive build-up of errors. However, by combining the EM field intensity with the thermal measurements, taking into account any movement of the item, a more accurate estimate of the future temperature can be obtained. The use of the thermal measurements allow for the consideration of the material properties and helps avoid drifting of the EM field to temperature mapping due to errors.

In non-limiting embodiments, the future temperature (P(t+1)) of the item 150 may be calculated using an Extended Kalman Filter model. The future temperature based on current temperature at time t can then be calculated by P(t+1)=P(t)+P', where P' is the temperature gradient of the microwave for the current temperature P, where P'=kE, where k is a constant that depends on the material properties of the item 150, and where E is the EM field strength. The observed temperature, z(t+1), may differ from the item temperature by a noise n, such that z(t+1)=P(t+1)+n. The EM measurements and estimates, along with the thermal measurements and estimates may then be used to estimate the value of k for the various points of the item 150 as well as refining the temperature and gradients over time.

In non-limiting embodiments, it may be determined that the EM field strength at a particular location may need to be changed, such as increasing or decreasing the EM field strength at the particular location, based on the calculated future temperature. For example, the calculated future temperature may be compared to a desired temperature.

In non-limiting embodiments, for analysis, the surface of the item 150 may be divided into m pixels $B=\{B_1, B_2, \ldots B_m\}$, and the 3D coordination of the pixels may be represented as $\{x_i, y_i, z_i\}$ where $i\in\{1, 2, \ldots m\}$. The mapping function $f$ maps the pixels and the timestamps to desired temperatures through the D minutes of heating in the microwave oven:

$$f(B_i, j) = p_{ij},\ i \in \{1, 2, \ldots m\}\ 0 < j < D$$

where j denotes the timestamp since start of the heating process, and $p_{ij}$ represents the desired temperature for the h pixel at the timestamp j.

The current temperature at each of the m pixels, $C=\{c_1, c_2, \ldots, c_m\}$, is measured by the thermal sensor. The current temperature C is compared to the desired heating pattern $f(B_i, j)$. The temperature difference between the current temperature or estimated future temperature and the desired temperature is represented by the heating gap $G=\{g_1, g_2, \ldots, g_m\}$. The EM field strength of at least one pixel may be adjusted based on the heating gap.

The EM field strength at specific locations of the item 150 may be adjusted during operation of the microwave oven 100 through actuations. These actuations may include moving the item 150, changing the size of the microwave chamber 102, using waveguides, moving the EM source, and/or altering the strength of the EM source. The item 150 may be moved in any axis in 3D space, for example, and may be moved in a latitudinal direction, a longitudinal direction, and/or an upward or downward direction (e.g., elevation). The item may be arranged on a platform 160 inside the microwave chamber 102, such as a turntable or any surface of or attached to an actuation device 107, such as a rotating mechanism, gripping mechanism, hanging platform, and/or the like.

In non-limiting embodiments, the actuation device 107 may be in communication with a controller 101. The controller 101 may include a computing device, such as one or more processors internal or external to the microwave oven 100. The controller 101 may be configured to control the operations of the actuation device 107 and may be configured to control the EM wave generator 170 (e.g., microwave generator). Control of the EM wave generator 170 may include turning the microwave generator 170 on or off, changing the phase/frequency, beamforming, and/or the like. The controller 101 may be configured to communicate with the thermal sensor 120 and the photo-sensor 112. The controller may be in communication with other sensors located inside or outside of the microwave chamber 102 (e.g. a humidity sensor). In non-limiting embodiments, the controller may be configured to communicate with the electromagnetic field sensor 110.

In non-limiting embodiments, the platform 160 may be moved automatically by a controller 101 while the item is being heated based on the heating gap. For example, the platform 160 may be rotated clockwise or counter-clockwise based on the offset angle of the platform 160. The temperature gradient $P'_\theta$ at each offset angle of the platform 160 may be maintained in a dictionary $\{\theta: P'_\theta\}$. The dictionary may be updated based on the EM field and temperature measurements. The vector $P'_\theta=\{p'_1, p'_2, \ldots, p'_m\}$ may be queried using the pixel coordinates. The cosine similarity $Sim_\theta$ between the temperature gradient $P'_\theta$ and the heating gap G is calculated by $$Sim_\theta = \frac{P'_\theta \cdot G}{|P'_\theta| \cdot |G|}.$$

Once the cosine similarity is computed, the platform 160 may be rotated to θ', which is the most well-aligned temperature gradient. This most well-aligned temperature gradient represents a decrease in the difference in the heating gap between the estimated future temperature and the desired temperature.

As the platform 160 is rotating, the cosine similarity may be continually calculated. Therefore, a new most well-aligned temperature gradient may be determined before the platform 160 reaches the originally calculated θ'. Any newly calculated θ' will override a previously calculated θ'. Therefore, the platform 160 may not reach the originally calculated θ' before being redirected to a new θ', such that $$\theta^* = \arg\max_{\theta} \; Sim_{\theta}.$$

The speed of movement of the platform 160 may depend on the calculated θ'. A calculated θ' that requires a larger movement may result in a faster movement of the platform 160. A small movement of the platform 160 may result in a slow movement of the platform 160.

The use of such an approximation algorithm allows the θ' to be calculated in real-time and avoids long computational processing times. This is advantageous to an approach that predicts the entire heating pattern, such as can be calculated based on modeling the desired heating pattern using a stochastic knapsack problem for resource allocation, because such an approach is comparatively resource intensive and would create intrinsic uncertainty.

In non-limiting embodiments, control of the EM field strength may include a combination of actuations (e.g., rotation and/or movement of a turntable) and control of the electromagnetic (EM) wave generator 170. The actuations and control of the EM wave generator 170 may be directed by a controller 101. Control of the EM field strength may be optimized by using a rotation plan S* that controls the EM field strength based on the desired heat trajectory P, which contains the collection of desired temperatures $p_{ij}$ for the pixels across the space and time. The rotation plan S as a sequence of angle-duration and electromagnetic (EM) wave generator on-off-duration tuples may be defined as:

$$S = \begin{bmatrix} \{\theta_1{:}d_{\theta 1}\}, \{\theta_2{:}d_{\theta 2}\}, \{\theta_3{:}d_{\theta 3}\}, \ldots \\ \{o_1{:}d_{o1}\}, \{o_2{:}d_{o2}\}, \{o_3{:}d_{o3}\}, \ldots \end{bmatrix}$$

$$D = \Sigma\{d_{\theta 1}, d_{\theta 2}, d_{\theta 3}, \ldots\} = \Sigma\{d_{o1}, d_{o2}, d_{o3}, \ldots\}$$

where $\{\theta_k{:}d_{\theta k}\}$ indicates that the turntable will stay at the absolute offset angle $\theta_k$ for a duration of $d_{\theta k}$, $\{o_1{:}d_{o1}\}$ describes the duration do for keeping the EM wave generator on or off ($o_k$). Based on these definitions, the optimized rotation plan is defined as:

$$S^* = \arg\min_{S} \; \Sigma\|\overline{P}(S) - P\|^2$$

where $\overline{P}(S)$ denotes the temperature trajectory for the m pixels using a rotation plan S over time. In non-limiting embodiments, the optimized plan may be based on movements other than rotations (e.g. movement of the item 150 in a 3D Cartesian coordinate system). The use of optimized plans allows for increased efficiently in the system that can result in faster heating times than traditional systems. The optimization plans may also be able to focus on ensuring the most energy efficient plan for heating the item 150.

In non-limiting embodiments, control of the EM field strength may be based on the humidity of the item 150. The humidity of the item may be determined based on the measured temperature and EM field measurements, including EM leakage from the microwave chamber 102. The humidity may also be determined from a humidity sensor in the microwave chamber 102 or item 150.

Based on experimental results, the use of a dynamically controlled turntable and control of the EM wave generator 170 results in a more uniform heating of liquids, such as milk, and items made of multiple materials, such as bacon including fat and meat. In experiments with 200 ml of milk with a non-limiting implementation, the use of the optimized rotation plan resulted in the final observed temperature being between 67° C. and 74° C. across the 9 measured points of the milk, resulting in no parts of the milk being hot enough to scald when drank or cold enough to allow bacteria to be preserved. In experimental data with bacon and a non-limiting implementation, the use of an optimized rotation plan resulted in a temperature difference across the meat of 10° C. and a temperature difference across the fat of 8° C. Compared to a typical constant rotation of a turntable, the use of the optimized rotation plan resulted in a more even distribution of temperature and allowed the bacon to maintain a more even shape after being cooked.

In non-limiting embodiments, the EM field strength may be controlled only using a dynamically controlled turntable. The dynamically controlled turntable may be controlled by a motor, such as a stepper motor. A coupler may be placed between the motor head and the turntable plate to enable precise control of the direction and speed of rotation of the plate. The speed of rotation may be a constant speed, or may be altered during operations. The rotating speed of the turntable may be limited to 12 RPM. In non-limiting embodiments, the movement of the turntable may begin only after an initial distribution of the EM fields is collected by the system.

In some non-limiting embodiments, the EM field strength may be controlled by adjusting the size (e.g., volume and/or shape) of the microwave chamber 102. The size of the microwave chamber may be increased or decreased by adjusting the location of a wall (e.g., a sidewall), the ceiling, and/or the floor of microwave chamber 102. As an example, the walls, ceiling, or floor may be installed on a rail system and moved along the rail to adjust their location. Various other mechanisms may be utilized to change the size of the microwave chamber.

In some non-limiting embodiments, the EM field strength may be controlled by moving the item 150 within the microwave chamber 102. The item 150 may be moved by a rotating mechanism, gripping mechanism, pushing mechanism, and/or the like to move the item to a different location within the microwave chamber 102, or to change the orientation of the item 150. The item 150 may also be compressed or spread out within the microwave chamber 102.

In non-limiting embodiments, the EM field strength may be controlled by the use of waveguides. Waveguides may include microwave shields and/or microwave susceptors. Microwave shields may be placed within the microwave chamber 102 to direct the microwaves away from their location. The microwave shields may be located on the item 150, below the item 150, around the item 150, or even between the microwave chamber and the EM wave generator 170. The microwave shields may be fixed to the platform 160 and/or may be fixed to a surface of the microwave chamber 102. The microwave shields may be static or, in other examples, the microwave shields may be movable during operation of the microwave 100. Moving the microwave shields during the operation of the microwave 100 may protect certain areas of the item 150 from being overheated. In non-limiting embodiments, the microwave shields may be arranged behind a barrier installed within the microwave chamber 102 (e.g., a glass plane). The barrier may be installed vertically, horizontally, or at an angle within the microwave chamber 102. The microwave shields may be fixed to the surface of the barrier or placed freely behind the barrier. Microwave susceptors may be arranged on or under the item 150 to absorb microwave energy and trigger high-heat reactions.

In non-limiting embodiments, waveguides may be used when the maximum peak-to-peak temperature difference among the pixels of the item 150 exceeds what is achievable by using a dynamically controlled turntable or other methods. Waveguides may be used in some examples when the desired maximum peak-to-peak temperature difference exceeds 21° C. Based on experimental data, the use of waveguides can result in a maximum peak-to-peak temperature difference of 183° C., with a temperature gradient of 61° C./cm (compared to 3° C./cm without the use of waveguides).

In non-limiting embodiments, the desired temperature may follow a recipe input received from a user or other device. The recipe may incorporate a non-uniform heating pattern (e.g., an arbitrary heating pattern or a predetermined variable heating pattern) that includes predetermined desired temperatures at each time step for each pixel of the item 150. For example, the recipe may be input by pressing pre-set buttons and/or interacting with a user interface. The non-uniform heating pattern may include different desired temperatures for different pixels. The heating pattern may also include different temperatures for the same pixel at different times. Certain temperatures may be desired for only certain periods of time during the heating process for particular pixels. The heating pattern may be developed through computational modeling based on the ingredients and on cooking principles.

In non-limiting embodiments, the desired temperature may be based on a uniform heating of the item 150. The uniform heating may be based on a set time for heating, a set final temperature, or a combination of a set time and final temperature. As the item is being heated, each pixel has the same desired temperature at each time point and the desired temperatures progress at a uniform pace across all pixels of the item 150. Based on experimental data, the use of a dynamically controlled turntable can heat a plate of rice from 20° C. to 60° C. in two minutes with a temperature difference between the maximum and minimum temperatures of the pixels over the rice of 6.5° C. and a standard deviation of temperature across the rice of 1.5° C. In comparison, using a typical turntable that rotates in a constant direction at a constant speed, the temperature difference 24.8° C. and the standard deviation was 9.5° C. When no rotation was used, the temperature difference was 29.5° C. and the standard deviation was 9.2° C.

Figure 4:
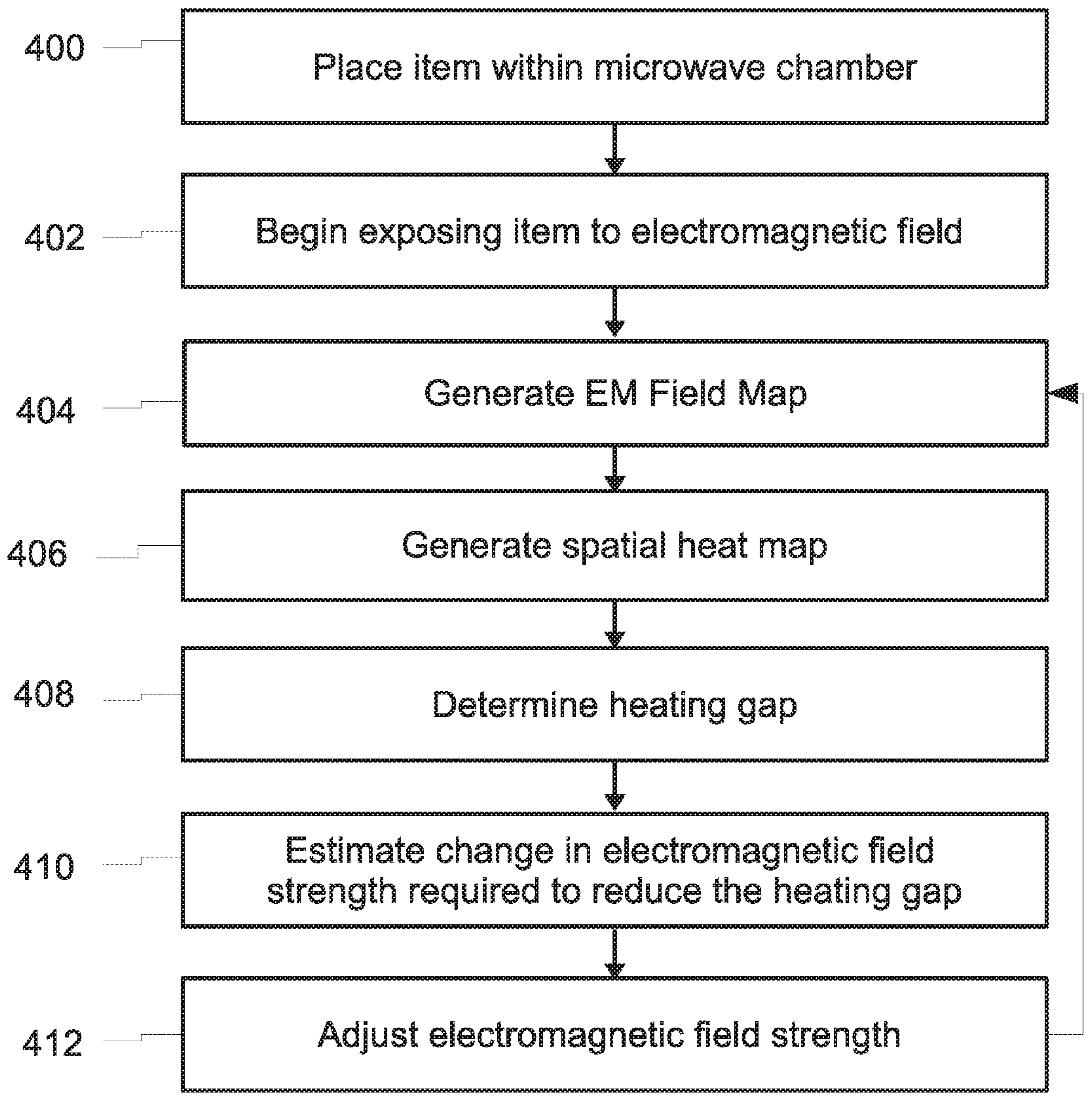
FIG. 4 is a flow diagram of a method of heating an item in a microwave oven according to a non-limiting embodiment.

Referring now to FIG. 4, a method for heating an item in a microwave is shown according to a non-limiting embodiment. It will be appreciated that the order of the steps shown in FIG. 4 is for illustrative purposes only and that non-limiting embodiments may involve more steps, fewer steps, different steps, and/or a different order of steps. The method starts at step 400 in which an item is placed within the chamber of a microwave. The item may be a single piece, or may be multiple pieces. The item may be made of a single material or may be a composite of multiple materials.

At step 402, the microwave is started, and the microwave begins exposing the contents of the microwave chamber to an electromagnetic field. The microwave may be started using a predetermined desired heating pattern of the item. The predetermined desired heating pattern may include a desired temperature of each region (e.g., one or more pixels) of the item at each time step of the heating of the item. In non-limiting embodiments, the initial electromagnetic field may be dependent on the type of item placed within the microwave chamber. A user may be able to input the type of item placed within the microwave chamber. The type of item may be input by the user through pre-set buttons or a user interface on the microwave or external device (e.g., such as a mobile computer). In non-limiting embodiments, the initial electromagnetic field may be based on a preset power level. The microwave oven may be set to run for a predetermined period of time or until a predetermined temperature of the surface of the item is reached. The microwave may be set to run until a predetermined temperature is maintained for a predetermined period of time.

At step 404, an electromagnetic field map is generated. At least one electromagnetic sensor located within the microwave chamber measures the electromagnetic field strength at the location of the sensor. Based on the location of the electromagnetic sensor and the strength of the electromagnetic field at that location, the electromagnetic field strength at other locations within the microwave chamber are estimated. If more than one electromagnetic sensor is used, the electromagnetic field strength can be estimated using an interpolation based on the measured electromagnetic field strengths. In non-limiting embodiments, a cubic spline interpolation may be used to approximate the electromagnetic field strength at other points within the microwave chamber. The electromagnetic field map may be 2D or 3D.

At step 406, a spatial heat map is generated. At least one thermal sensor measures a plurality of thermal measurements of the surface of the item in the microwave chamber. Each thermal measurement is correlated to a region, or pixel, of the item surface.

At step 408, a real-time heating gap is computed for each pixel of the item surface. The real-time heating gap is calculated as the difference between the current temperature of each pixel of the item surface and the desired temperature of the item surface at that time step.

At step 410, an estimated change in the electromagnetic field strength required to reduce the heating gap is determined. The estimated change is determined based on the estimated future temperature at the pixel locations based on the current electromagnetic field strength. The estimated change may be determined by computing a cosine similarity between the temperature gradient at the target angles and the current heating gap.

At step 412, the electromagnetic field is adjusted based on the estimated change. The electromagnetic field at the pixel location may be adjusted by rotating the item on a turntable and/or by turning the electromagnetic wave source on or off. The amount of rotation and the on-off-duration may be determined based on the temperature trajectory for the pixels. The heating gap may compared to the temperature gradient for each possible rotation angle of a turntable. The turntable then begins to rotate to the rotation angle that best reduces the heating gap.

Steps 404-412 may be continually repeated as the microwave operates. Step 404 can be started, for example, every 0.1 seconds. The adjustment of the electromagnetic field does not have to be completed before a new adjustment is determined. Newly determined adjustments may override previously determined adjustments.

Figure 5:
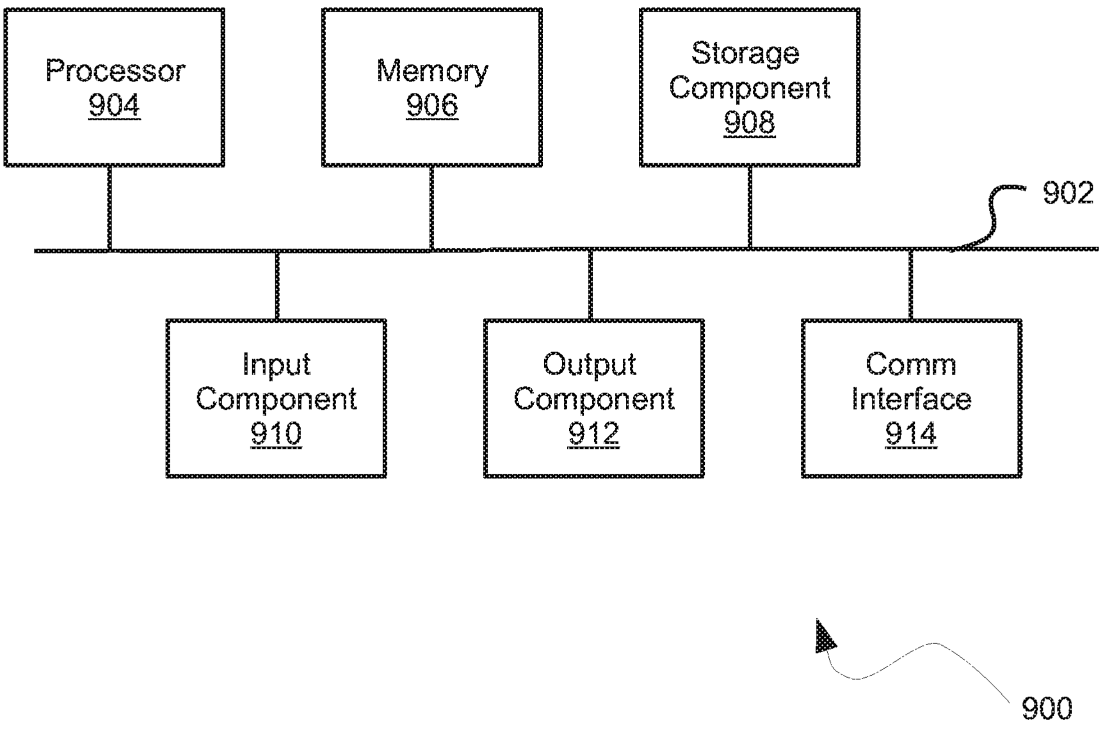
FIG. 5 illustrates example components of a computing device used in connection with non-limiting embodiments.

Referring now to FIG. 5, shown is a diagram of example components of a computing device 900 for implementing and performing the systems and methods described herein according to non-limiting embodiments. In some non-limiting embodiments, device 900 may include additional components, fewer components, different components, or differently arranged components than those shown in FIG. 5. Device 900 may include a bus 902, a processor 904, memory 906, a storage component 908, an input component 910, an output component 912, and a communication interface 914. The bus 902 may include a component that permits communication among the components of the device 900. In some non-limiting embodiments, the processor 904 may be implemented in hardware, firmware, or a combination of hardware and software. For example, the processor 904 may include a processor (e.g., a central processing unit (CPU), a graphics processing unit (GPU), an accelerated processing unit (APU), etc.), a microprocessor, a digital signal processor (DSP), and/or any processing component (e.g., a field-programmable gate array (FPGA), an application-specific integrated circuit (ASIC), etc.) that can be programmed to perform a function. Memory 906 may include random access memory (RAM), read only memory (ROM), and/or another type of dynamic or static storage device (e.g., flash memory, magnetic memory, optical memory, etc.) that stores information and/or instructions for use by the processor 904.

With continued reference to FIG. 5, the storage component 908 may store information and/or software related to the operation and use of the device 900. For example, the storage component 908 may include a hard disk (e.g., a magnetic disk, an optical disk, a magneto-optic disk, a solid state disk, etc.) and/or another type of computer-readable medium. The input component 910 may include a component that permits the device 900 to receive information, such as via user input (e.g., a touch screen display, a keyboard, a keypad, a mouse, a button, a switch, a microphone, etc.). Additionally, or alternatively, the input component 910 may include a sensor for sensing information (e.g., a photo-sensor, a thermal sensor, an electromagnetic field sensor, a global positioning system (GPS) component, an accelerometer, a gyroscope, an actuator, etc.). The output component 912 may include a component that provides output information from the device 900 (e.g., a display, a speaker, one or more light-emitting diodes (LEDs), etc.). The communication interface 914 may include a transceiver-like component (e.g., a transceiver, a separate receiver and transmitter, etc.) that enables device 900 to communicate with other devices, such as via a wired connection, a wireless connection, or a combination of wired and wireless connections. The communication interface 914 may permit the device 900 to receive information from another device and/or provide information to another device. For example, the communication interface 914 may include an Ethernet interface, an optical interface, a coaxial interface, an infrared interface, a radio frequency (RF) interface, a universal serial bus (USB) interface, a Wi-Fi® interface, a cellular network interface, and/or the like.

The device 900 may perform one or more processes described herein. Device 900 may perform these processes based on the processor 904 executing software instructions stored by a computer-readable medium, such as the memory 906 and/or the storage component 908. A computer-readable medium may include any non-transitory memory device. A memory device includes memory space located inside of a single physical storage device or memory space spread across multiple physical storage devices. Software instructions may be read into memory 906 and/or storage component 908 from another computer-readable medium or from another device via the communication interface 914. When executed, software instructions stored in the memory 906 and/or the storage component 908 may cause processor 904 to perform one or more processes described herein. Additionally, or alternatively, hardwired circuitry may be used in place of or in combination with software instructions to perform one or more processes described herein. Thus, embodiments described herein are not limited to any specific combination of hardware circuitry and software. The term "programmed or configured," as used herein, refers to an arrangement of software, hardware circuitry, or any combination thereof on one or more devices.

Although embodiments have been described in detail for the purpose of illustration, it is to be understood that such detail is solely for that purpose and that the disclosure is not limited to the disclosed embodiments, but, on the contrary, is intended to cover modifications and equivalent arrangements that are within the spirit and scope of the appended claims. For example, it is to be understood that the present disclosure contemplates that, to the extent possible, one or more features of any embodiment can be combined with one or more features of any other embodiment.

The invention claims is:

1. A method for heating an item in a microwave oven comprising:

capturing, with at least one electromagnetic field sensor, at least one electromagnetic field measurement of a microwave chamber, each electromagnetic field measurement of the at least one electromagnetic field measurement corresponding to a region in the microwave chamber;

generating an electromagnetic field map of the microwave chamber based on the at least one electromagnetic field measurement;

capturing, with at least one sensor, a plurality of thermal measurements of the item being heated in the microwave chamber, each thermal measurement of the plurality of thermal measurements corresponding to a region on the item; and controlling at least one of a position of the item and the electromagnetic field while the item is being heated in the microwave chamber based on the electromagnetic field map and the plurality of thermal measurements.

2. The method of claim 1, further comprising arranging at least one microwave susceptor on the item.

3. The method of claim 1, wherein controlling the electromagnetic field comprises arranging at least one microwave shield in the microwave chamber.

4. The method of claim 1, wherein generating the electromagnetic field map comprises:

applying an electromagnetic field to at least one neon light located within the microwave chamber;

sensing, with at least one photo-sensor, a light emission by the at least one neon light; and estimating the electromagnetic field based on a location of the at least one neon light and at least one of a flashing frequency and a brightness of the at least one neon light.

5. The method of claim 4, wherein the at least one photo-sensor is located outside of the microwave chamber and the light emission by the at least one neon light is transferred outside of the microwave chamber through a fiber optic cable.

6. The method of claim 1, wherein controlling at least one of a position of the item and the electromagnetic field further comprises:

comparing the plurality of thermal measurements to a desired heating pattern;

determining a difference between the plurality of thermal measurements and the desired heating pattern;

determining an estimated change in an electromagnetic field strength required to reduce the difference based on the electromagnetic field and a calculated future temperature; and adjusting the electromagnetic field based on the estimated change.

7. The method of claim 6, further comprising continuously comparing the plurality of thermal measurements to the desired heating pattern.

8. The method of claim 6, wherein the desired heating pattern is a uniform temperature for each of the plurality of thermal measurements.

9. The method of claim 6, wherein the desired heating pattern is predetermined based on a type of item placed within the microwave chamber.

10. The method of claim 1, wherein the item is arranged on a turntable within the microwave chamber, and wherein controlling the position of the item comprises altering at least one of the rate of rotation and the direction of rotation of the turntable.

11. A system for heating an item in a microwave oven, the system comprising:

at least one electromagnetic field sensor configured to capture at least one electromagnetic field measurement of a microwave chamber, each electromagnetic field measurement of the at least one electromagnetic field measurement corresponding to a region in the microwave chamber;

generating, with at least one processor, an electromagnetic field map of the microwave chamber based on the at least one electromagnetic field measurement;

at least one sensor configured to capture a plurality of thermal measurements of the item being heated in the microwave chamber, each thermal measurement of the plurality of thermal measurements corresponding to a region on the item; and controlling, with at least one processor, at least one of a position of the item and the electromagnetic field while the item is being heated in the microwave chamber based on the electromagnetic field map and the plurality of thermal measurements.

12. The system of claim 11, further comprising arranging at least one microwave susceptor on the item.

13. The system of claim 11, wherein controlling the electromagnetic field comprises arranging at least one microwave shield in the microwave chamber.

14. The system of claim 11, wherein generating the electromagnetic field map comprises:

applying an electromagnetic field to at least one neon light located within the microwave chamber;

sensing, with at least one photo-sensor, a light emission by the at least one neon light; and estimating, with at least one processor, the electromagnetic field based on a location of the at least one neon light and at least one of a flashing frequency and a brightness of the at least one neon light.

15. The system of claim 14, wherein the at least one photo-sensor is located outside of the microwave chamber and the light emission by the at least one neon light is transferred outside of the microwave chamber through a fiber optic cable.

16. The system of claim 11, wherein controlling at least one of a position of the item and the electromagnetic field further comprises:

comparing, with at least one processor, the plurality of thermal measurements to a desired heating pattern;

determining, with at least one processor, a difference between the plurality of thermal measurements and the desired heating pattern;

determining, with at least one processor, an estimated change in an electromagnetic field strength required to reduce the difference based on the electromagnetic field and a calculated future temperature; and adjusting, with at least one processor, the electromagnetic field based on the estimated change.

17. The system of claim 16, further comprising continuously comparing the plurality of thermal measurements to the desired heating pattern.

18. The system of claim 16, wherein the desired heating pattern is a uniform temperature for each of the plurality of thermal measurements.

19. The system of claim 16, wherein the desired heating pattern is predetermined based on a type of item placed within the microwave chamber.

20. The system of claim 11, wherein the item is arranged on a turntable within the microwave chamber, and wherein controlling the position of the item comprises altering at least one of the rate of rotation and the direction of rotation of the turntable.

21. The system of claim 16, wherein the desired heating pattern comprises a plurality of temperatures corresponding to a plurality of points on a surface of the item, wherein the plurality of temperatures comprises at least two different temperatures.

22. The system of claim 11, wherein generating the electromagnetic field map comprises:

applying an electromagnetic field to at least one dipole antenna located within the microwave chamber;

converting, with at least one rectifier, an electric current emitted by the at least one dipole antenna to a direct current; and estimating the electromagnetic field based on a location of the at least one dipole antenna and the direct current of the at least one dipole antenna.

23. The system of claim 11, wherein the item is arranged on a 6 DoF platform within the microwave chamber, and wherein controlling the position of the item comprises altering at least one of the following: a longitudinal location, a latitudinal location, an elevation, a pitch angle, a yaw angle, a roll angle, or any combination thereof.

* * * * *